Feb. 26, 1963 S. RUHMAN 3,079,592
MAGNETIC COMPUTING
Filed Nov. 5, 1954 2 Sheets-Sheet 1

INVENTOR
SMIL RUHMAN
BY Elmer J. Gorn
ATTORNEY

Feb. 26, 1963 S. RUHMAN 3,079,592

MAGNETIC COMPUTING

Filed Nov. 5, 1954 2 Sheets-Sheet 2

INVENTOR
SMIL RUHMAN
BY Elmer J. Gorn
ATTORNEY

3,079,592
MAGNETIC COMPUTING

Emil Ruhman, Waltham, Mass., assignor to Raytheon Company, Lexington, Mass., a corporation of Delaware Filed Nov. 5, 1954, Ser. No. 467,075
12 Claims. (Cl. 340—174)

This invention relates to magnetic control methods and systems, and particularly to the use of saturable magnetic elements in the handling of computations or analogous information in code pattern as, for example, a binary code utilizing two contrasting digits adapted for representation in the form of two contrasting magnetic saturation conditions brought about alternately in each of such saturable magnetic elements by application of code-controlled pulse energy thereto.

The invention is characterized by the utilization of power amplifying properties inherent in the magnetic components of the system, said properties being utilized to accomplish multiple distribution of the information signals, so that they may become available at a plurality of branched outlet points, or to accomplish multiplication of the signal power level at one or more outlet points.

The invention is herein illustrated and described in several forms it may assume when incorporated into a magnetic core register of the "single line-shifting" type, or of a type embodying at least some characteristics of the "single line" variety of shift register. It is to be understood, however, that the invention is equally applicable to any computing apparatus wherein there is incorporated one or more saturable magnetic elements having inherent therein the property of amplifying the power utilization of the system by reason of its (or their) propensity to transfer to the output side of the system more energy than is required for the performance of the particular computing function assigned thereto. Accordingly, the invention is to be understood as being limited only by the scope of the inventive principles reflected herein, and not to the specific details illustrated in the accompanying drawings wherein:

All of the illustrated embodiments of the invention relate to the type of magnetic computer which has come to be known in the art as a "shift register." Briefly, such a register consists of a plurality of stages through which the coded information is progressively passed, with each stage including one or more toroidal magnetic cores composed of material having high magnetic retentivity and a relatively open hysteresis loop characteristic, approaching the rectangular in contour. With such cores being utilized as receivers of information-representing current pulses, the effect of introduction of a current pulse of predetermined polarity into such a core is to "read into" the core a code value which will remain therein as long as desired, the "reading-in" pulse being effective to drive the core from saturation in one magnetic polarity to saturation in the opposite magnetic polarity. If and when this is followed by introduction of an actuating "shift" pulse of proper polarity, the core flux will reverse and return to the original polarity, at the same time generating in an "output" or "read-out" winding a current pulse indicative of the coded value previously "read into" the core. In this manner the coded information is shifted through the register, stage by stage, for delivery to an outlet point.

Figure 1:
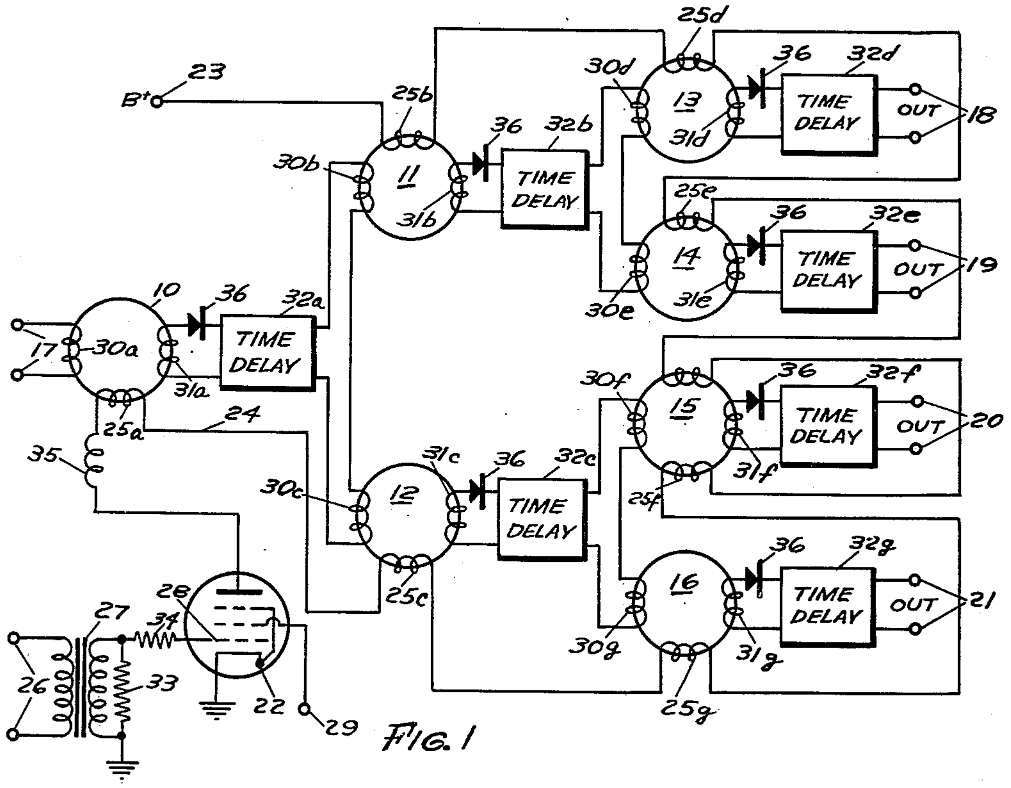
FIG. 1 is a diagram of electrical components and connections representing an embodiment of the invention.

Referring now to FIG. 1, the first stage of the illustrated system is shown as involving a single magnetic core 10, the second stage as involving a pair of magnetic cores 11 and 12, and the third stage as involving four magnetic cores 13, 14, 15 and 16, serving to supply to the four outlet branches 18, 19, 20, and 21 the digital information entering the system at the input winding 30*a* of core 10, said winding being supplied from information-receiving input terminals 17.

For supplying actuating "shift" power to all three stages, and to all four branches of the register, there is required only the single pentode driver 22 taking its energy from the B+ source 23 by way of the single actuating circuit 24 which includes, in series relationship, the "shift" windings 25, *a* to *g*, of all of the cores of the register. The circuit 24 is intermittently active to apply one shift pulse for each digital time interval, the duration and time spacing of the pulses being determined by the repetition rate of application of the control signal energy to the control input terminals 26.

The control pulses entering the system at 26 serve to trigger the tube 22 by way of the intervening transformer 27 and the control grid 28 of the tube. As each successive shift pulse is thus applied to all of the shift windings 25, *a* to *g*, simultaneously, there is a correspondingly progressive transfer of information-representing signal energy from stage to stage of the register, by way of the circuits linking the corresponding output windings 31, *a* to *g*, to the corresponding input windings 30, *b* to *g*, or to the register outlet terminals 18 to 21, as the case may be, the transfer through each linking circuit being in two steps, in accordance with conventional practice, by reason of the momentary holding action of the conventional temporary storage units incorporated into the time delay units 32, *a* to *g*.

Since each core is in reality a saturating magnetic amplifier, and since each "read-out" of information-representing current from a given core is a result of a flux reversal in that core, which flux reversal drives the core to saturation in the opposite direction, the process necessarily produces a power amplification of a magnitude, assuming appropriate proportions between related parts of the circuitry, amply sufficient to drive at least two cores of the next following stage to their opposite saturation condition, if the information pattern so requires, and this power amplification is accomplished without imposing any additional strain upon the single driver tube 22. That is, the increased power delivery from source 23 is due solely to the amplifying action within those cores which are "reading out" code-significant energy, therefore there is no demand upon tube 22 to perform any amplifying function beyond the minimum degree of amplification normal to a pentode amplifier of the character indicated. Indeed, since the sole function of tube 22 is to initiate and control the timing of the flow of current in circuit 24, all of the necessary amplification of power being performed within the cores themselves, even the single tube 22 could be replaced by any equivalent switching or timing device capable of dividing the operation into alternating "on" and "off" periods of the proper relative durations and frequency to facilitate maintenance of the desired succession of "read-in" and "read-out" functions at the desired cycling speed. In any case, additional amplifying tubes are not necessary to accomplish the actual operations of current transfer, from stage to stage, as the inherent amplification properties of the cores are adequate for these operations.

Figure 2:
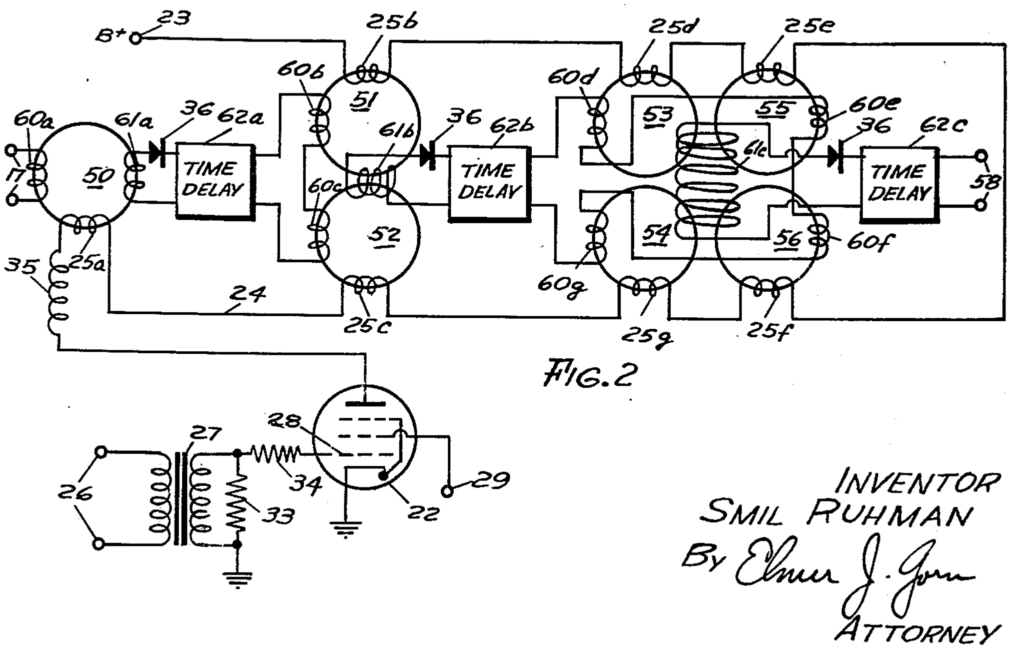
FIG. 2 is a diagram of electrical components and connections representing a second embodiment of the invention.

In FIG. 1 the inherent amplification characteristics of the magnetic cores have been applied in a manner to permit distribution ("branching") of the information as heretofore noted, to a multiplicity of outlet stations 18, 19, 20, and 21. FIG. 2 shows the invention applied in a manner which utilizes these inherent amplifying characteristics to permit operation of a single outlet station at a multiplied power level, which the degree of power multiplication being in direct proportion to the number of successive stages of the register. (A third application of the invention could be provided by combining a portion of the distribution pattern of FIG. 1 with a portion of the power multiplication pattern of FIG. 2, to obtain the advantages of distribution and power multiplication in a single system.)

Referring to FIG. 2 in greater detail, the system there shown includes magnetic cores 50 to 56, inclusive, arranged in expanding stages like those of FIG. 1. The system is similar to that of FIG. 1 insofar as the operation of the actuating circuit 24 for said cores is concerned, but it differs from the FIG. 1 system in having the output windings 61*b* and 61*c* so wound as to interlink all cores of their respective stages, so that each successive stage has only a single outlet line, but said single outlet line is at a power level substantially equal to the combined amplification properties of the component cores feeding it. Thus, as shown, the outlet line from temporary storage unit 62*b* will have approximately twice the power level of the outlet line from similar unit 62*a*, and by the same token the outlet terminals 58 of unit 62*c* will in turn deliver approximately twice the power that is delivered by unit 62*b*. In all other respects the operation of the FIG. 2 system compares with that of FIG. 1, as indicated by the use of corresponding reference characters in the two views.

Figures 3, 4, 5:
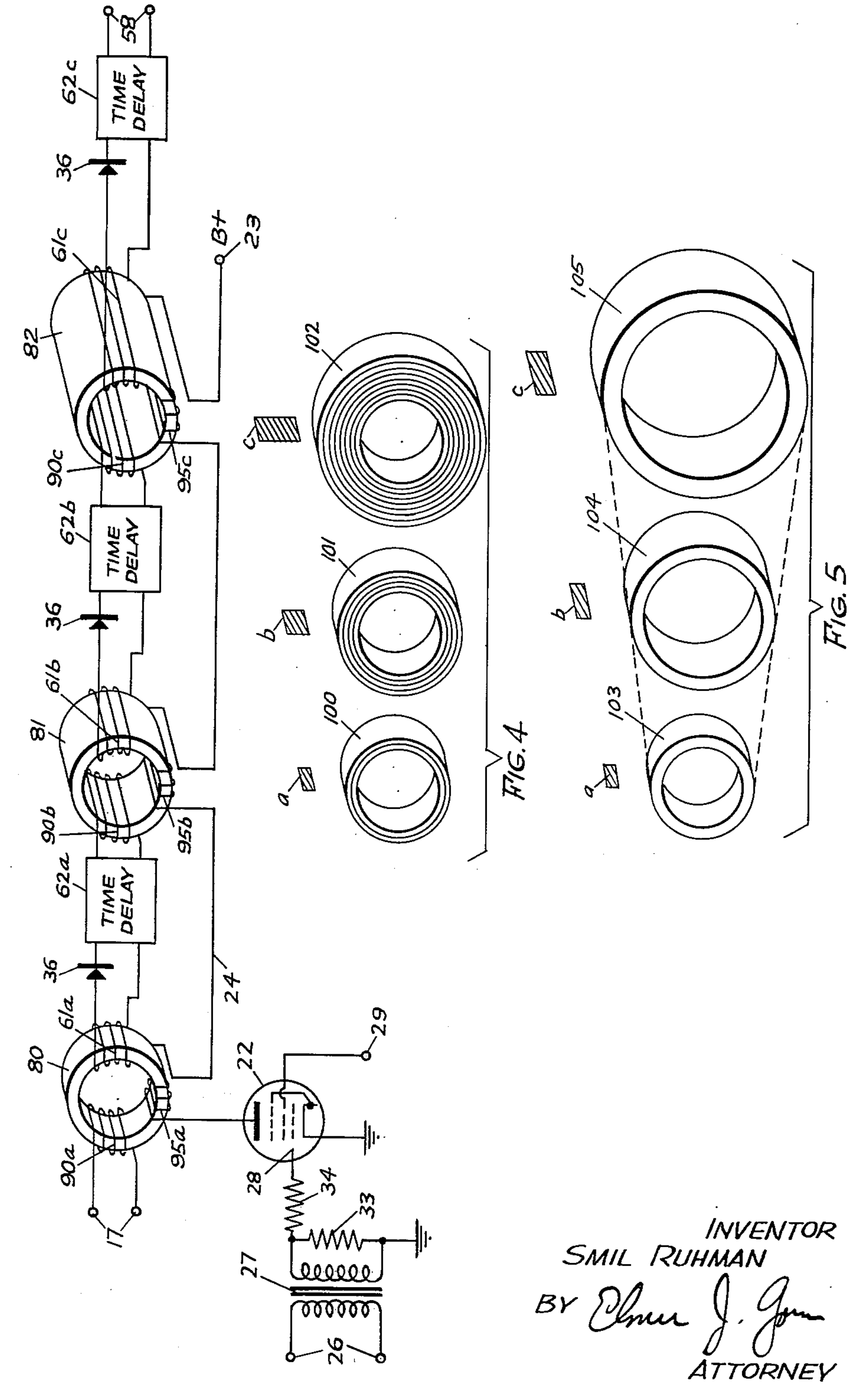
FIG. 3 is a diagram of a third embodiment.
FIGS. 4 and 5 are perspective views of magnetic components differing structurally from their counterparts in FIGS. 2 and 3, but constituting magnetic equivalents thereof.

FIGS. 3 and 4 show two physical variations from the core structure of FIG. 2. In FIG. 3 the "read-out" windings 61*a*, 61*b* and 61*c* correspond electrically to windings 61*a*, 61*b*, and 61*c*, respectively, of FIG. 2, but in FIG. 3 they are wound upon single cores of progressively longer length, in order to provide flux saturating capacities approximately equal to the cumulative flux saturating capacities of the interlinked cores of the corresponding stages in FIG. 2. Similarly, the single "read-in" windings 90*b* and 90*c* function comparably to the plural read-in windings 60*b* to 60*g*, inclusive, in FIG. 2, and the single actuating "shift" windings 95*b* and 95*c* function comparably to the plural actuating windings 25*b* to 25*g*, inclusive, of FIG. 2. Other components of FIG. 3, having identity with their counterparts in FIG. 2, bear corresponding reference characters. The power multiplication obtained in the FIG. 3 arrangement will, obviously, be substantially the same as in FIG. 2. Likewise, a corresponding power multiplication could be obtained by substituting, in the system of FIG. 3, magnetic cores 100, 101, and 102 (FIG. 4) for the cores 80, 81, and 82, respectively, of FIG. 3, the cross-sectional areas "*a*," "*b*" and "*c*" of the FIG. 4 cores being in the ratio 1–2–4, as are those of FIG. 3. The same ratio of cross-sectional areas obtains in FIG. 5, but the cores 103, 104, and 105 of FIG. 5 will provide an even greater multiplication ratio due to the progressively increasing diameters of the cores, resulting in correspondingly longer flux paths.

Referring to FIGS. 3 and 4, the cores 80, 81, and 82 of FIG. 3 are of a common diameter but have progressively increasing lengths, while the cores 100, 101, and 102 of FIG. 4 have a common length but have progressively increasing diameters. This result may be brought about by winding a variable number of turns of flat ribbon about a core-forming mandrel to produce cores of superimposed (spirally wound) ribbon composition, as indicated in FIG. 4. With such composition all such cores will have a common inner diameter, as well as a common length (such common length being determined, of course, by the width chosen for the flat ribbon) but will vary in power amplifying capacity in accordance with the ratio of increase in their outer diameters. The latter, obviously, will be a function of the number of turns of ribbon entering into the formation of the successive cores.

While FIG. 1 shows successive stages branching from preceding stages in multiples of two, it is to be understood that the pattern may be altered to suit the logic of any computation or control program to which the invention is applied. Thus the second stage may include three or more branches, in place of the two branches shown, and the number of succeeding stages, as well as the number of branches per stage, may vary as such computing or control logic requires. Likewise, the pattern of power amplification, illustrated in FIGS. 2 and 3, may be altered to include additional stages and/or different multiplication ratios. Indeed, the multiplication ratio may be of any value between one and infinity.

Whenever, in either FIG. 2 or FIG. 3, a single core winding is shown as being a functional equivalent of a plurality of corresponding windings of FIG. 1 (as, for example, the winding 61*b* of FIG. 2, which is the functional counterpart of windings 31*b* and 31*c* of FIG. 1) it is to be understood that the number of turns in such single coil counterpart will vary depending on the relative amounts of voltage and current amplification entering into the total power amplification obtained.

As used herein the terms "computing" and "computation" embrace all forms of information handling as, for example, the collection, storage, and/or distribution of manipulating or procedural instructions or intelligence data, whether or not such information involves mathematical processes as well.

In FIGS. 1, 2, and 3 the screen grid of the pentode driver tube 22 is connected to a suitable source 29 of intermediate potential, while the cathode of the tube, as well as one terminal of the transformer secondary circuit, is connected to ground potential. The said transformer secondary circuit also preferably includes an oscillation damping shunt resistance 33 and a current-limiting series resistance 34, while the plate circuit of the tube preferably includes a stabilizing inductance unit 35. The readout circuits from the various cores include the usual directional control diodes or equivalent unidirectional impedance units, as indicated at 36 in the several views.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a computing system, a first magnetic stage including a magnetic core having input and output circuits and a relatively small flux capacity, a second magnetic stage comprising a magnetic core of substantially greater diameter than said first stage core having an input circuit and a substantially larger flux capacity, means for applying a current pulse to said first stage input circuit to saturate said first magnetic stage with flux flowing in one direction, means for reversing flux flow in said first stage and thereby generating current in said first stage output circuit, and means for applying to said second stage input circuit the current generated by operation of said flux reversing means.

2. In a computing system, a first stage magnetic core having input and output circuits, a plurality of second stage magnetic cores having a common serially connected input circuit, an output circuit for said second stage magnetic cores comprising a single output winding each turn of which interlinks each of said second stage magnetic cores, means for applying a current pulse to said first stage input circuit to saturate said first stage core with flux flowing in one direction, means for reversing flux flow in said first stage magnetic core and thereby generating current in said first stage output circuit, and storage means for applying to said second stage input circuit the current generated in said first stage output circuit by operation of said flux reversing means.

3. In a computing system, a first stage magnetic core having input and output circuits and a relatively small flux capacity, a second stage magnetic core of the same diameter and of greater length than said first stage magnetic core and having an input circuit and a substantially larger flux capacity, means for applying a current pulse to said first stage input circuit to saturate said first stage core with flux flowing in one direction, and means for delivering to said second stage input circuit the current generated in said first stage output circuit, said current being effective to saturate the larger flux capacity of said second stage core upon delivery of said current thereto to provide power multiplication therein.

4. A computing system as defined in claim 1, wherein said magnetic core in said second magnetic stage has at least twice the diameter and twice the flux capacity of said first stage.

5. A computing system as defined in claim 1, wherein said last-named means comprises an energy storage device interposed between said first and second stage magnetic cores, and having series relationship electrically to said second stage input circuit.

6. In a multi-stage computation register employing saturable magnetic elements in the successive stages, for the successive receipt of information-representing current impulses, the method of controlling the transfer of said current impulses, stage by stage, which includes the step of multiplying the power utilization by doubling the number of saturable magnetic elements in each successive stage, and the step of extracting said current pulses from each stage by a common winding each turn of which interlinks all said saturable magnetic elements of said stage.

7. In a multi-stage computation register employing saturable magnetic elements in the successive stages, for the successive receipt of information-representing current impulses, the method of controlling the transfer of said current impulses, stage by stage, which includes the step of distributing the current impulses by way of serially connected windings each turn of which embraces a larger number of register elements as said impulses pass from one stage of the register to the next, each of said register branches employing saturable magnetic elements having a flux capacity which is at least double the flux capacity of said magnetic elements in the preceding stage.

8. A computing system as defined in claim 1, wherein said second magnetic stage includes at least an additional saturable magnetic element, each additional element of a flux capacity equal to the total flux capacity of said first magnetic stage, and a common output winding each turn of which interlinks all the cores of said second stage.

9. A computing system as defined in claim 1 wherein said second magnetic stage includes a plurality of additional saturable magnetic means each of which has a flux capacity which is at least double the flux capacity of said first magnetic stage.

10. In a computing system, a first magnetic stage comprising a magnetic core having windings thereon and input and output circuits connected thereto, a second magnetic stage including a plurality of magnetic cores having an input winding included in an input circuit connected thereto, means for applying a current pulse to said first stage input circuit to saturate said first magnetic stage with flux flowing in one direction, means for reversing flux flow in said first stage and thereby generating current in said first stage output circuit, means for applying to said second stage input circuit current generated by operation of said flux reversing means, and output winding means each turn of which interlinks each of said second stage cores for multiplying the power utilization in said second magnetic stage, as compared with the power utilization in said first magnetic stage, said means including a single series-connected output circuit.

11. In a computing system, a first magnetic stage having input and output circuits, a second magnetic stage including a plurality of magnetic cores each having an input winding forming part of an input circuit, means for applying a current pulse to said first stage input circuit to saturate said first magnetic stage with flux flowing in one direction, means for reversing flux flow in said first stage and thereby generating current in said first stage output circuit, means for applying to said second stage input circuit the current generated by operation of said flux reversing means, and output winding means each turn of which embraces said second stage cores for multiplying the power utilization in said second magnetic stage to a value which is at least double the power utilization in said first magnetic stage.

12. A multi-stage computation register comprising a single saturable magnetic means in each of a series of stages, means for transferring information-representing current impulses through the register, stage by stage, and means for multiplying the power utilization in each successive stage, said multiplying means including a magnetic core of the same diameter and of increased length for developing in said saturable magnetic means the power amplifying factor inherent in the process of flux saturation of said saturable magnetic means.

References Cited in the file of this patent

UNITED STATES PATENTS

| | | |
|---|---|---|
| 2,652,501 | Wilson | Sept. 15, 1953 |
| 2,673,337 | Avery | Mar. 23, 1954 |

OTHER REFERENCES

"The Use of Magnetic Cores as Switching Devices," by Minnick, published by the Computation Laboratory of Harvard University and placed on file in the Harvard main library, Sept. 16, 1953, pp. 6–30 to 6–37 relied upon.